(12) United States Patent
Wobben

(10) Patent No.: US 6,398,502 B1
(45) Date of Patent: Jun. 4, 2002

(54) QUIET ROTOR BLADE AND WIND ENERGY INSTALLATION EQUIPPED WITH ROTOR BLADES OF THIS TYPE

(76) Inventor: Aloys Wobben, Argestrasse 19, Aurich D-26607 (DE)

( * ) Notice: Subject to any disclaimer, the term of this patent is extended or adjusted under 35 U.S.C. 154(b) by 0 days.

(21) Appl. No.: 09/508,806
(22) PCT Filed: Sep. 4, 1998
(86) PCT No.: PCT/EP98/05615
§ 371 (c)(1), (2), (4) Date: May 18, 2000
(87) PCT Pub. No.: WO00/16366
PCT Pub. Date: Mar. 23, 2000

(30) Foreign Application Priority Data

Oct. 2, 1997 (DE) .......................................... 197 43 694

(51) Int. Cl.⁷ ............................................... F03D 11/02
(52) U.S. Cl. ....................................... 416/228; 416/243
(58) Field of Search ................................ 416/228, 243, 416/DIG. 5

(56) References Cited

U.S. PATENT DOCUMENTS

| | | | |
|---|---|---|---|
| 4,427,344 A | | 1/1984 | Perry |
| 4,552,511 A | * | 11/1985 | Sumigawa .................. 416/242 |
| 4,692,095 A | * | 9/1987 | Lawson-Tancred .......... 416/23 |
| 5,332,362 A | * | 7/1994 | Toulmay et al. ........ 416/223 R |
| 5,433,586 A | | 7/1995 | Cole |
| 5,551,369 A | * | 9/1996 | Shen .......................... 114/274 |
| 5,927,948 A | * | 7/1999 | Perry et al. ................. 416/228 |
| 6,065,937 A | * | 5/2000 | Hunt .......................... 416/189 |

FOREIGN PATENT DOCUMENTS

| | | |
|---|---|---|
| DE | 4440744 | 5/1996 |
| DE | 19614420 A1 | 10/1997 |
| EP | 0 482 932 | 4/1992 |

OTHER PUBLICATIONS

Wagner et al., "Wind Turbine Noise", Springer–Verlag Berlin/Heidelberg, p. 88 (1996) ISBN 3–540–60592–4.

* cited by examiner

Primary Examiner—Edward K. Look
Assistant Examiner—Ninh Nguyen
(74) Attorney, Agent, or Firm—Townsend and Townsend and Crew LLP

(57) ABSTRACT

The invention concerns a rotor blade and a wind power installation having a rotor blade provided with a rotor blade trailing edge, wherein the rotor blade tapers towards the rotor blade trailing edge. The invention is distinguished in that, in the region of the rotor blade trailing edge, the degree of taper of the rotor blade increases in a direction towards the rotor blade trailing edge, and there is no stair-like step in the rotor blade at least in the region of the rotor blade.

9 Claims, 1 Drawing Sheet

QUIET ROTOR BLADE AND WIND ENERGY INSTALLATION EQUIPPED WITH ROTOR BLADES OF THIS TYPE

CROSS-REFERENCES TO RELATED APPLICATIONS

This application is a §371 of PCT/EP98/05615, filed Sep. 4, 1998.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The invention concerns a rotor blade and a wind power installation having a rotor blade, wherein the rotor blade is provided with a rotor blade trailing edge and tapers towards the rotor blade trailing edge.

Rotor blades for wind power installations are known in many different forms. Unfortunately many rotor blades in the state of the art suffer from the problem that in operation of the wind power installation and with wind strengths from about 5 to 6 m/second, they generate not inconsiderable sound emissions, to a not inconsiderable extent. The sound emissions which have occurred hitherto mean inter alia that wind power installations meet resistance on the part of wide classes of society and population, because of the amount of noise generated. As a consequence, wind power installations sometimes encounter difficulty in being accepted or are not accepted at all, as the authorities with responsibility for granting permission for setting up wind power installations refuse such permission because of the environmental considerations involved—noise also counts as environmental pollution. Therefore, for reasons of noise, particularly in the proximity of residential buildings, it is desirable to reduce the above-mentioned considerable levels of noise emission, in order to satisfy the statutory requirements and to increase the acceptance of wind power installations.

Therefore the object of the present invention is to reduce the level of sound emissions of wind power installations.

BRIEF SUMMARY OF THE INVENTION

In accordance with the invention, with a rotor blade of the kind set forth in the opening part of this specification, that object is achieved in that in the region of the rotor blade trailing edge the degree of taper of the rotor blade increases in a direction towards the rotor blade trailing edge, and there is no stair-like step in the rotor blade at least in that region of the rotor blade.

A particularly advantageous embodiment of the invention is distinguished in that the degree of taper of the rotor blade increases at given spacings in a direction towards the rotor blade trailing edge. In that respect, it is particularly preferable that bends in the cross-section of the trailing edge portion of the rotor blade, that is to say a portion adjacent to the rotor blade trailing edge, are formed at the respective spacings, and between said bends said portion of the rotor blade is substantially flat. Then, in this form of the invention, the planes which are disposed between the bends form very shallow angles relative to each other so that overall the assembly gives approximately the form of a convexly curved surface in respect of the cross-section of the trailing edge portion of the rotor blade.

In a further advantageous embodiment of the rotor blade according to the invention, there are three bends each extending substantially parallel to the rotor blade trailing edge. That embodiment represents an optimum compromise between the expenditure involved in production of the bends in the rotor blade, and a desired marked reduction in the noise level of the rotor blade as it moves.

It is particularly preferred that the inclined planes which adjoin each other in the form of bends and which form the taper configuration for the rotor blade in a direction towards the rotor blade trailing edge are provided only on one side of the rotor blade. In that case it is advantageous if the bends are formed only on the suction or reduced-pressure side of a rotor blade having a pressure side and a reduced-pressure side. That configuration provides for a particularly marked reduction in the level of sound emissions. In that case, it has proven to be desirable that the acute angles which the planes of the reduced-pressure side of the rotor blade, that are between the bends, form with the pressure side of the rotor blade, become increasingly more acute. In that respect, the reduction in the magnitude of the respective angles occurs from the trailing edge towards the leading edge of the rotor blade. The plane portion of the reduced-pressure side of the rotor blade, which is most closely adjacent to the rotor blade trailing edge, then forms the almost sharp rotor blade trailing edge, with the flat pressure side of the rotor blade.

Wind power installations provided with the rotor blade according to the invention overall exhibit a marked reduction in the noise level generated, by virtue of the reduced sound emission of the individual rotor blade. Accordingly, the wind power installations according to the invention represent a markedly reduced noise pollution aspect for the population. Therefore, the wind power installation according to the invention considerably reduces the above-discussed disadvantages of the wind power installations in the state of the art, the level of acceptance of wind power installations on the part of the people is increased and existing anti-noise requirements are more easily met.

Further advantageous embodiments of the invention are set forth in the appendant claims.

BRIEF DESCRIPTION OF THE DRAWINGS

The invention is described in greater detail hereinafter by means of an embodiment illustrated in the accompanying drawing. In the drawing.

DETAILED DESCRIPTION OF THE INVENTION

Figure 1:
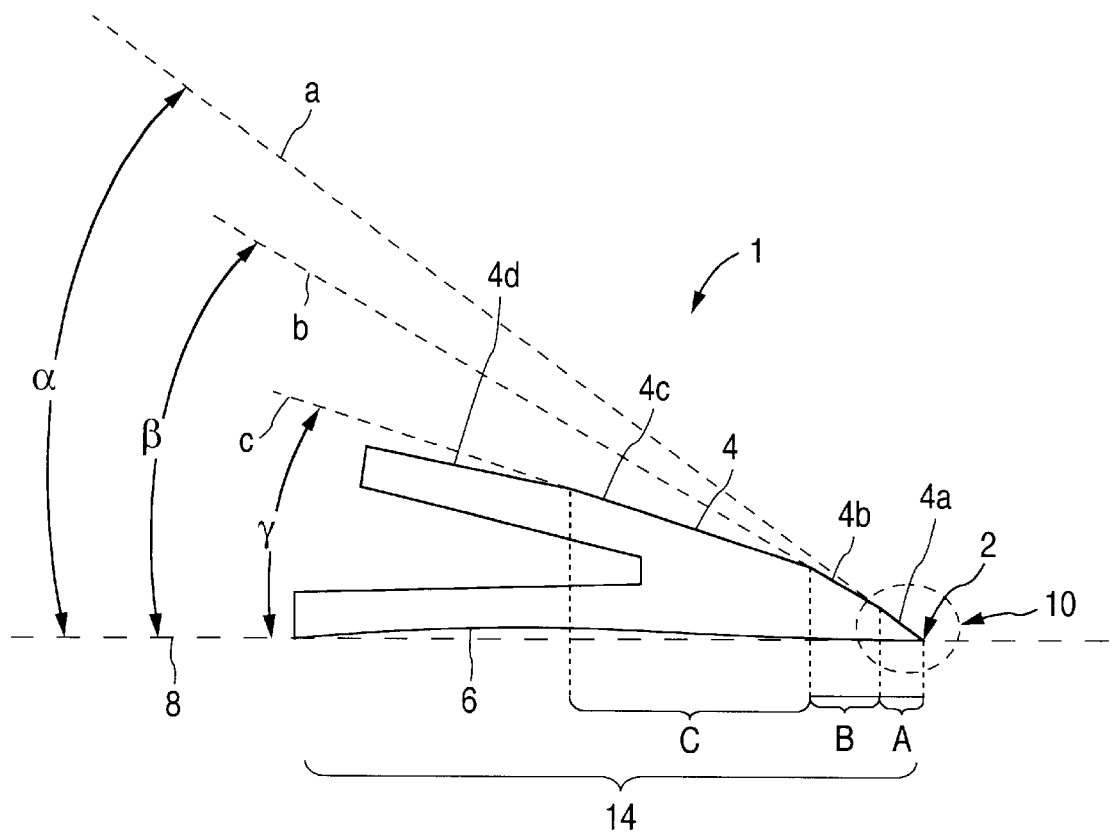
FIG. 1 is a view in cross-section through a rear portion, which is towards the rotor blade trailing edge, of an embodiment of the rotor blade according to the invention.

Referring to FIG. 1, shown therein is an embodiment of a rotor blade 1 according to the invention. FIG. 1 shows only the rear part of the rotor blade 1, which is adjacent to a rotor blade trailing edge 2. The two sides of the rotor blade 1, a suction or reduced-pressure side 4 which is shown at the top in FIG. 1 and a pressure side 6 which is shown at the underneath in FIG. 1, come together at the rotor blade trailing edge 2. The two sides of the rotor blade 1 meet at an acute angle α. The angle α is formed by a plane 8 which contains the substantially flat pressure side 6 of the rotor blade 1, and an inclined plane a. The plane a contains a portion 4a of the reduced-pressure side 4 of the rotor blade 1, the portion 4a being directly adjacent to the rotor blade trailing edge 2. The portion 4a which is of a substantially flat configuration therefore determines in a region A the degree of taper of the rotor blade 1 towards the rotor blade trailing edge 2. A portion 4b of the reduced-pressure side 4 adjoins the portion 4a steplessly, that is to say without forming a stair-like step. The portion 4b is part of a plane b which forms an angle β with the plane 8. The angle β is smaller than the angle α so that the portion 4b of the reduced-pressure side 4 includes, with the pressure side 6, a more acute angle than is the case between the portion 4a and the plane 8. Therefore, in the region B in FIG. 1, the degree of taper of the rotor blade 1 is determined by the gradient of the portion 4b. The degree of taper in the region B of the portion 4b is smaller than in the region A of the portion 4a. Within each of the respective regions B and A respectively however, the degree of taper is almost constant as the portions 4b and 4a of the reduced pressure side 4 are, in themselves, substantially flat.

The portion 4b is then in turn followed in a direction towards the rotor blade leading edge (not shown) in a stepless configuration—in the above-defined sense—by the next portion 4c of the reduced-pressure side 4, the portion 4c also being in the form of an inclined plane. The portion 4c is part of a plane c which forms an angle γ with the plane 8. The angle γ is in turn smaller than the angle β. The region C of the rotor blade 1, the dimensions of which are determined by the length of the portion 4c of the reduced-pressure side 4, also has an almost constant degree of taper of the rotor blade 1, as the portion 4c and the pressure-side 6 disposed in opposite relationship in that region are also substantially flat.

After the portion 4c, as viewed from the rotor blade trailing edge 2, the portion 4c is again steplessly adjoined by a portion 4d. The foregoing description relating to the portions 4a to 4c also correspondingly applies to the portion 4d. Depending on the respective requirements made on the rotor blade 1, the above-described successive arrangement of inclined planes within the reduced-pressure side 4, which include increasingly more acute angles with the pressure side 6, can be continued as desired. In a preferred embodiment, bends in the cross-section of the trailing edge portion 14 of the rotor blade, that is to say a portion adjacent to the rotor blade trailing edge, are formed at the respective spacings, and between said bends said portion of the rotor blade is substantially flat. It should be emphasized in this respect that the drawing shows the actual configurations and relationships in greatly exaggerated form for the sake of enhanced clarity of the drawing.

Figure 2:
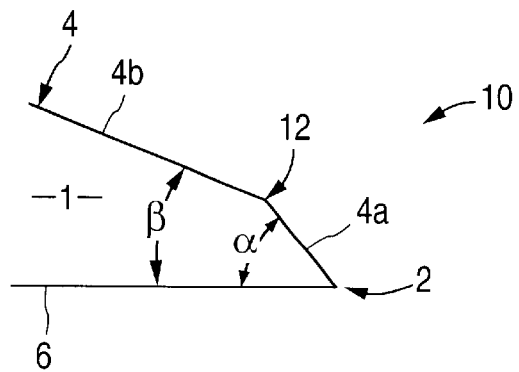
FIG. 2 shows a portion from FIG. 1.

FIG. 2 shows a view on an enlarged scale of a part as indicated at 10 in FIG. 1, for further clarification. It will be particularly clear from FIG. 2 that there is no change in level in the form of a step between the inclined plane 4a and the inclined plane 4b, but the portions 4a and 4b adjoin each other at a bend 12 in the reduced-pressure side 4. It will also be clear that the angle α between the portion 4a and the pressure side 6 is greater than the angle β which is included between the portion 4b of the reduced-pressure side 4 and the pressure side 6.

What is claimed is:

1. A wind power installation rotor blade having a rotor blade trailing edge, wherein a cress section of the rotor blade tapers towards the rotor blade trailing edge, characterised in that the degree of taper of the rotor blade increases in a direction towards the rotor blade trailing edge in the region of the rotor blade trailing edge, the degree of taper increases at spacings and remains constant between the locations at which the increase occurs.

2. A rotor blade according to claim 1 characterised in that the degree of taper increases in the form of at least one bend in the rotor blade.

3. A rotor blade according to claim 2 characterised in that the bend or bends extends or extend substantially parallel to the rotor blade trailing edge.

4. A rotor blade according to claim 2 characterised in that there are three bends.

5. A rotor blade according to claim 2 characterised in that the bend or bends is or are provided only on one side of the rotor blade.

6. A rotor blade according to claim 2 having a pressure side and a reduced-pressure side, characterised in that the bend or bends is or are provided only on the reduced-pressure side.

7. A wind power installation having a rotor which has one or more rotor blades according to claim 1.

8. A wind power installation rotor blade having a rotor blade trailing edge, wherein a cross section of the rotor blade tapers towards the rotor blade trailing edge, characterised in that the degree of taper of the rotor blade increases in a direction towards the rotor blade trailing edge in the region of the rotor blade trailing edge, the degree of taper increases at spacings and remains constant between the locations at which the increase occurs; and further comprising a rotor blade trailing edge portion of the rotor blade, which is adjacent to the rotor blade trailing edge, characterised in that one side of the rotor blade trailing edge portion is substantially flat.

9. A rotor blade according to claim 8 characterised in that the substantially flat side of the rotor blade trailing edge portion includes, with the other side, angles which are increasingly more acute in a direction towards the rotor blade leading edge, as viewed from the rotor blade trailing edge.

* * * * *